United States Patent [19]
Jones et al.

[11] Patent Number: 6,059,663
[45] Date of Patent: May 9, 2000

[54] ONE-PIECE SEALING SYSTEM FOR A UNIVERSAL JOINT ASSEMBLY

[75] Inventors: Michael J. Jones, Boyertown; Michael J. Rogers, Wyomissing, both of Pa.

[73] Assignee: Neapco Inc., Pottstown, Pa.

[21] Appl. No.: 09/114,687

[22] Filed: Jul. 13, 1998

[51] Int. Cl.[7] .................................................. F16D 3/16
[52] U.S. Cl. .......................................... 464/133; 277/562
[58] Field of Search ................................. 464/7, 11, 133, 464/128, 131; 277/562, 565, 566, 560

[56] References Cited

U.S. PATENT DOCUMENTS

| | | | |
|---|---|---|---|
| 2,996,901 | 8/1961 | Kleinschmidt | 464/131 |
| 3,200,615 | 8/1965 | Stokely | 64/17 |
| 3,955,859 | 5/1976 | Stella et al. | |
| 4,515,574 | 5/1985 | Mazziotti | 464/131 |
| 4,527,672 | 7/1985 | Schreiner et al. | 277/634 |
| 4,530,675 | 7/1985 | Mazziotti | 464/131 |
| 4,592,556 | 6/1986 | Nieman et al. | 277/565 |
| 4,861,315 | 8/1989 | Mazziotti | 464/131 |
| 4,874,349 | 10/1989 | Gall | 464/14 |
| 5,588,915 | 12/1996 | Smith | 464/14 |
| 5,716,277 | 2/1998 | Reynolds | 464/131 |
| 5,813,916 | 9/1998 | Lentini et al. | 464/14 |
| 5,975,534 | 11/1999 | Tajima et al. | 277/562 X |

FOREIGN PATENT DOCUMENTS

| | | | |
|---|---|---|---|
| 3818330 | 12/1989 | Germany | 464/131 |
| 59-144821 | 8/1984 | Japan | 464/128 |

*Primary Examiner*—Lynne H. Browne
*Assistant Examiner*—Greg Binda
*Attorney, Agent, or Firm*—Woodcock Washburn Kurtz Mackiewicz & Norris LLP

[57] ABSTRACT

A one-piece sealing system for a universal joint assembly. A lubricant seal adapted to prevent the leakage of lubricant between the trunnion and bearing cup of a universal joint wherein the trunnion has a cylindrical portion merging into an outwardly flaring arcuate portion, the seal including an elastomer body bonded to the interior of a stiffening ring. The body of the seal has two annular lips that extend from a thin section as two symmetrical cantilever protrusions each having a fully radiused tip, the line of symmetry for the symmetrical lips running from a point near the intersection of the trunnion diameter and the trunnion arcuate radius toward the center of the trunnion arcuate radius, the thin section above the two cantilevered protrusions allowing both lips of the seal to pivot about the line of symmetry, the first one of the lips contacting the trunnion journal diameter and being directed toward the interior of the bearing cup to maintain the level of the bearing lubricant, the second lip contacting the trunnion arcuate radius and is directed away from the interior of the bearing cup to deny the entrance of environmental contaminants, the combination of the thin section and the symmetric lips allowing the interference points of the seal to float. The body of the seal has a third annular lip having a radius greater than the radius of the second annular lip and projects outwardly of the stiffening ring and beyond the open end of the bearing cup for contacting the end of the trunnion arcuate surface remote from the trunnion cylindrical journal portion to deny entrance of environmental contaminants into the bearing cup in the absence of a separate outer seal ring.

2 Claims, 2 Drawing Sheets

ONE-PIECE SEALING SYSTEM FOR A UNIVERSAL JOINT ASSEMBLY

RELATED APPLICATION

A related application is Ser. No. 079,727 filed May 15, 1998 by Michael J. Jones and Michael J. Rogers entitled "Sealing System for a Universal Joint Assembly" and assigned to the same assignee as the present application. The related application discloses a two-piece sealing system for a universal joint assembly.

BACKGROUND OF THE INVENTION

The present invention relates to a sealing system for a universal joint assembly and particularly to a one-piece sealing system.

Universal joint assemblies are well known in the art and in general include a cross member having a body portion having four trunnions extending outwardly from the body portion. Each of the trunnions generally includes an outer cylindrical friction surface extending outwardly from the body portion and an outer cylindrical journal surface extending outwardly from the friction surface and an arcuate surface interconnecting the journal surface and the friction surface. Each of the trunnions is provided with a bearing cup having an open end and an inner bearing surface. The bearing cups are disposed about the trunnion such that the inner bearing surface of the bearing cup is disposed coaxially about the outer cylindrical journal surface of the trunnion. Needle bearings are disposed between the inner bearing surface of the bearing cup and the outer journal surface of the trunnion for permitting rotation of the bearing cup relative to the trunnion.

One-piece and two-piece sealing systems for universal joint assemblies are well known in the art. Examples of two piece systems are shown in our aforesaid related application Ser. No. 079,727 and in U.S. Pat. Nos. 4,874,349, 5,588,915 and 5,716,277. In such systems a seal is provided at the open end of the bearing cup for engaging the surface of the trunnion and designed to keep the lubricant within the bearing cup. The second piece of the seal, sometimes referred to as the seal guard or dust guard, extends over the open end of the bearing cup and engages the trunnion friction surface to prevent the entry of dirt and other contaminants into the interior of the universal joint. Examples of one-piece sealing systems are shown in U.S. Pat. Nos. 3,200,615, 4,515,574, 4,530,675 and 4,861,315. While the sealing systems of the prior art have been satisfactory, in many respects they have left something to be desired in regard to simplicity of construction and effectiveness.

SUMMARY OF THE INVENTION

It is an object of the present invention to provide an improved sealing system for a universal joint assembly where the sealing system is of the one-piece type and eliminates the need for an outer boot seal.

In accordance with one aspect of the present invention there is provided an improved sealing system for a universal joint assembly including a cross member having a body portion having at least one trunnion extending outwardly from the body portion, the trunnion including an outer cylindrical journal surface extending outwardly from the body portion and an arcuate surface interconnecting the journal surface and the body portion. A bearing cup is provided having an open end and an inner bearing surface, the bearing cup being disposed about the trunnion such that the inner bearing surface of the bearing cup is disposed coaxially about the outer cylindrical journal surface of the trunnion and needle bearing means are disposed between the inner bearing surface of the bearing cup and the outer cylindrical journal surface of the trunnion for permitting rotation of the bearing cup relative to the trunnion. The improved sealing system includes a universal joint seal composed of a molded elastomeric annular body bonded to the interior of a stiffening ring, the seal being retained in the inside diameter of the bearing cup by means of a press fit between the inner diameter of the bearing cup and the outside diameter of the stiffening ring. The body of the seal has first and second annular lips that extend from a thin section as two symmetrical cantilever protrusions each having a fully radiused tip, the line of symmetry from the two symmetrical lips running from a point near the intersection of the outer cylindrical journal surface and the trunnion arcuate surface toward the center of the trunnion arcuate surface. The thin section above the two cantilevered protrusions allows both lips of the seal to pivot about the line of symmetry, the first lip contacting the outer cylindrical journal and being directed toward the internal bearing surface to maintain the level of the bearing lubricant, the second lip contacting the trunnion arcuate surface and being directed away from the internal bearing surface to deny the entrance of environmental contaminants, the combination of the thin section and the two symmetrical lips allowing the interference points of the seal to float. The body of the seal has a third annular lip having a radius greater than the radius of the second annular lip and projecting outwardly from the stiffening ring and beyond the open end of the bearing cup for contacting the trunnion arcuate surface adjacent the body portion to deny entrance of environmental contaminants into the universal joint seal and the bearing cup in the absence of a separate outer seal ring.

In another aspect of the invention there is provided a one-piece lubricant seal adapted to prevent the leakage of lubricant between a trunnion and a bearing cup of a universal joint and wherein the trunnion has an outer cylindrical journal surface merging into an outwardly flaring arcuate surface. The seal comprises an elastomeric annular body bonded to the interior of a stiffening ring, the stiffening ring comprising a cup shaped member including a cylindrical portion having at opposite sides an outwardly extending annular rim and an inwardly extending annular rim. The seal is retained in the inside diameter of the bearing cup by means of a press fit between the inside diameter of the bearing cup and the outside diameter of the cylindrical portion of the stiffening ring and the outwardly extending annular rim limiting the depth of insertion of the stiffening ring into the bearing cup. The elastomeric body of the seal has first and second annular lips that extend from a thin section as two symmetrical cantilever protrusions each having a fully radiused tip, the line of symmetry for the two symmetrical lips running from a point near the intersection of the outer cylindrical journal surface and the trunnion arcuate surface toward the center of the trunnion arcuate surface, the thin section above the two cantilevered protrusions allowing both of the lips of the seal to pivot about the line of symmetry. The first lip contacts the outer cylindrical journal surface and is directed toward the internal bearing surfaces to maintain the level of the bearing lubricant and the second lip contacts the trunnion arcuate surface and is directed away from the internal bearing surface to deny the entrance of environmental contaminants, the combination of the thin section and the two symmetrical lips allowing the interference points of the seal to float. The molded body includes a third annular lip having a radius greater than the radius of the second annular lip and projecting outwardly from the stiffening ring and beyond the outwardly extending annular rim thereof and beyond the open end of the bearing cup for contacting the end of the outer arcuate surface remote from the trunnion cylindrical journal surface to deny entrance of environmental contaminants into the bearing cup.

For other objects and advantages of the invention, reference is to be had to the following drawings and description.

DETAILED DESCRIPTION OF THE PREFERRED EMBODIMENT

Figure 1:
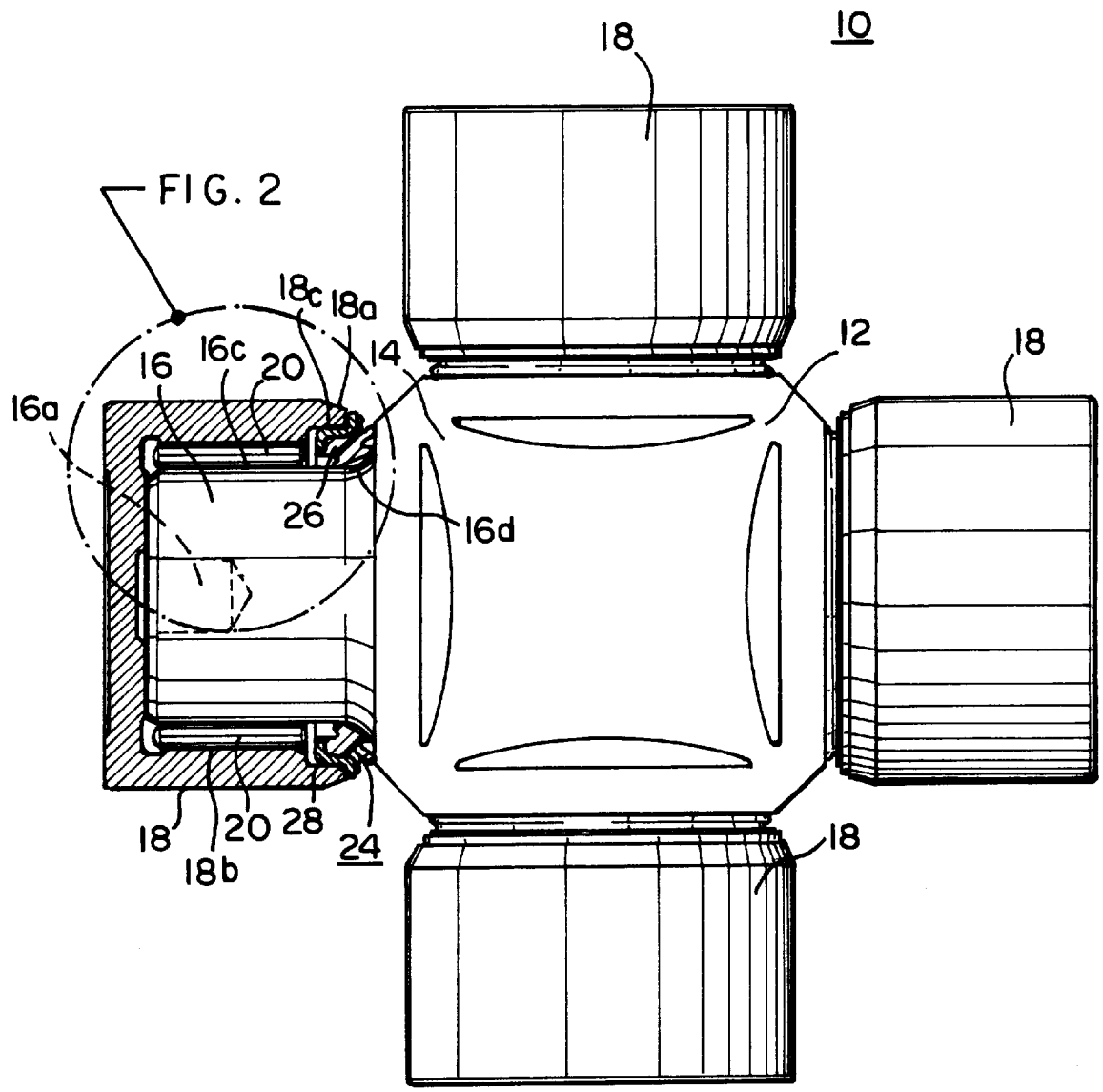
FIG. 1 is an elevational view partially in cross section of a cross member for a universal joint and an improved one-piece sealing system in accordance with the present invention.

Referring to FIG. 1 there is illustrated a universal joint 10 with an improved one-piece sealing system in accordance with the present invention. The universal joint includes a cross member 12 having a body portion 14 having four trunnions 16, only one of which is seen in FIG. 1. The trunnions 16 are all identical and each includes a lubricant reservoir 16a. Each of the trunnions 16 includes an outer cylindrical journal surface 16c extending outwardly from the body portion 14 and an arcuate surface 16d interconnecting the journal surface 16c and the body portion 14. Each of the trunnions 16 is provided with a bearing cup 18 having an open end 18a and an inner bearing surface 18b. The bearing cups 18 are disposed about the trunnions of the cross member such that the inner bearing surface 18b about the bearing cup is disposed coaxially about the outer cylindrical journal surface 16c of the trunnion. A plurality of needle bearings 20 are disposed between the inner bearing surface 18b of the bearing cup and the outer cylindrical journal surface 16c of the trunnion 16 for permitting rotation of the bearing cup 18 relative to the trunnion 16.

Figure 2:
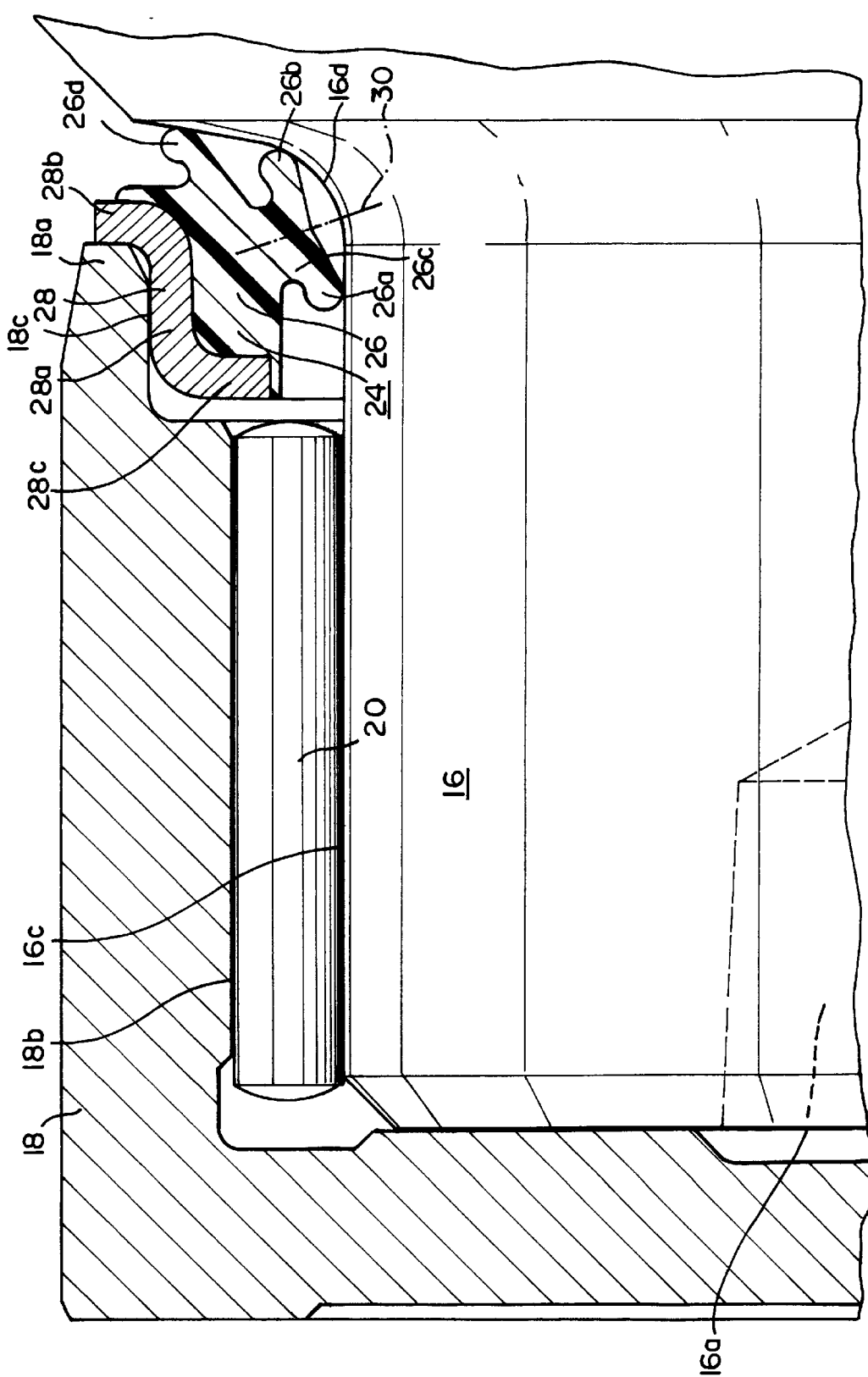
FIG. 2 is an enlarged fractional view of the bulls eye portion of the cross sectional structure illustrated in FIG. 1.

The improved one piece sealing system of the present invention includes a universal joint seal 24 composed of a molded elastomer annular body 26 bonded to the interior of a stiffening ring 28. The stiffening ring 28, as best seen in FIG. 2, is in the form of a cup shaped member including a cylindrical portion 28a having at the opposite ends an outwardly extending annular rim 28b and an inwardly extending annular rim 28c. The seal 24 is inserted into the open end 18a of the bearing cup 18 and is retained in the inside diameter 18c of the open end of the bearing cup 18 by means of a press fit between the inside diameter 18c of the bearing cup and the outside diameter of cylindrical portion 28a of the stiffening ring 28. It will be noted in FIG. 2 that the outwardly extending annular rim 28b engages the open end 18a of the bearing cup and the inwardly extending annular rim 28c extends over the ends of the needle bearings 20.

The elastomeric body 26 of the seal 24 is provided with two annular lips 26a and 26b that extend from a thin section 26c as two symmetrical cantilever protrusions each having a fully radiused tip. The annular lip 26b has a radius greater than the annular lip 26a. The line of symmetry 30 for the symmetrical lips 26a and 26b runs from a point near the intersection of the outer cylindrical journal surface 16c and the trunnion arcuate surface 16d toward the center of the trunnion arcuate surface. The thin section 26c above the two cantilevered protrusions 26a and 26b allow both lips of the seal 24 to pivot about the line of symmetry 30, one of the lips 26a contacting the outer cylindrical journal surface 16c and being directed toward the internal bearing surfaces to maintain the level of the bearing lubricant, and the other lip 26b contacting the trunnion arcuate surface 16d beyond the open end 18a of the bearing cup 18 and is directed away from the internal bearing surfaces to deny entrance of environmental contaminants. The combination of the thin section 26c and the symmetrical lips 26a and 26b allow the interference points of the seal 24 to float.

The molded elastomeric body 26 of the seal 24 is provided with a third annular lip 26d having a radius greater than the radius of the second annular lip 26b. The third annular lip 26d projects outwardly from the stiffening 28 and beyond the outwardly extending rim 28b thereof and beyond the open end 18a of the bearing cup for contacting the end of the trunnion arcuate surface 16d where it merges with the body portion 14 remote from the trunnion cylindrical journal portion 16c to deny entrance of environmental contaminants into the bearing cup 18. By reason of the fact that the third annular lip 26d projects outwardly from the stiffening ring 28 and beyond both the outwardly extending flange 28b thereof and beyond the open end 18a of the bearing cup 18, it can contact the end of the trunnion arcuate surface 16d remote from the trunnion cylindrical journal portion 16c and thereby deny entrance of environmental contaminants into the bearing cup 18.

In the assembly of the improved sealing system on the universal joint assembly, the universal joint seals 24 are inserted into the open end 18a of the bearing cups 18 with the cylindrical section 28a of the stiffening ring 28 forming a press fit with the inside diameter 18c of the bearing cup 18 and the outwardly extending annular rim 28b engaging the open end 18a of the bearing cups 18. After the bearing cups 18 with the needle bearings 20 and universal joint seal 24 have been assembled as shown in FIG. 2, the bearing cup 18 and seal assemblies are then assembled onto the trunnions 16 of the cross member 12'. After assembly, the first lip 26a of the seal 24 will contact the journal trunnion diameter 16c and the second lip 26b will contact the trunnion arcuate radius 16d. The third lip 26d of the seal 24 will project beyond the open end 18a of the bearing cup 18 and contact the end of the trunnion arcuate surface 16c where it merges with the body portion 14 remote from the outer cylindrical journal surface 16c to deny entrance of environmental contaminants into the bearing cup 18 as well as the interior of the seal 24 housing lips 26a and 26b.

The combination of the elastomeric thin section 26c and symmetric lips 26a, 26b in the improved universal joint seal of the present invention allows the interference points of the seal to "float". This feature lends itself to ease in design modifications. In prior art designs which utilize set interference points on the journal trunnion diameter and trunnion radius, any modifications to the trunnion diameter or trunnion radius also require the seal to be modified. By providing this seal with a third annular lip having a radius greater than the radius of the symmetrical lips and projecting outwardly from the stiffening ring and beyond the outwardly extending flange thereof and beyond the open end of the bearing cup for contacting the end of the trunnion arcuate surface where it merges with the body portion remote from the outer cylindrical journal surface there is eliminated a need for a second sealing ring in the form of an outer boot seal or dust cap.

While a preferred embodiment of the invention has been described and illustrated, it will be understood that further modifications may be made without departing from the spirit and scope of the invention as set forth in the appended claims.

What is claimed is:

1. In a universal joint assembly comprising a cross member having a body portion having at least one trunnion extending outwardly from said body portion, said trunnion including an outer cylindrical journal surface extending outwardly from said body portion and an arcuate surface interconnecting said journal surface and said body portion; a bearing cup having an open end and an inner bearing surface, said bearing cup being disposed about said trunnion such that said inner bearing surface of said bearing cup is disposed coaxially about said outer cylindrical journal surface of said trunnion; and needle bearing means disposed between said inner bearing surface of said bearing cup and said outer cylindrical journal surface of said trunnion for permitting rotation of said bearing cup relative to said trunnion, the improvement of a sealing system comprising:

a universal joint seal composed of a molded elastomeric annular body bonded to the interior of a stiffening ring and projecting outwardly therefrom, said seal being retained in the inside diameter of the bearing cup by means of a press fit between the inside diameter of the bearing cup and the outside diameter of the stiffening ring, said body of said seal having first and second annular lips that extend from a thin section as two symmetrical cantilever protrusions each having a fully radiused tip, the line of symmetry for the two symmetrical lips running from a point near the intersection of the outer cylindrical journal surface and the trunnion arcuate surface toward the center of the trunnion arcuate surface, the thin section above the two cantilevered protrusions allowing both lips of the seal to pivot about the line of symmetry, the first lip contacting the outer cylindrical journal surface and being directed toward the internal bearing surface to maintain the level of the bearing lubricant, the second lip contacting the trunnion arcuate surface and is directed away from the internal bearing surface to deny the entrance of environmental contaminants, the combination of the thin section and the two symmetrical lips allowing the interference points of the seal to float, and said body having a third annular lip having a radius greater than the radius of said second annular lip and projecting outwardly from said stiffening ring and beyond the open end of said bearing cup for contacting said trunnion arcuate surface adjacent said body portion to deny entrance of said environmental contaminants into said universal joint seal and said bearing cup in the absence of a separate outer seal ring.

2. A one-piece lubricant seal adapted to prevent the leakage of lubricant between a trunnion and a bearing cup of a universal joint and wherein the trunnion has an outer cylindrical journal surface merging into an outwardly flaring arcuate surface, said seal comprising an elastomeric body bonded to the interior of a stiffening ring, said stiffening ring comprising a cup shaped member including a cylindrical portion and an outwardly extending annular rim and an inwardly extending annular rim, said seal being retained in the inside diameter of the bearing cup by means of a press fit between the inside diameter of the bearing cup and the outside diameter of the cylindrical portion of the stiffening ring and the outwardly extending annular rim limiting the depth of insertion of the stiffening ring into the bearing cup, said elastomeric body of said seal having first and second annular lips that extend from a thin section as two symmetrical cantilever protrusions each having a fully radiused tip, the line of symmetry for the two symmetrical lips running from a point near the intersection of the outer cylindrical journal surface and the trunnion arcuate surface toward the center of the trunnion arcuate surface, the thin section above the two cantilevered protrusions allowing both said lips of the seal to pivot about the line of symmetry, the first lip contacting the outer cylindrical journal surface and being directed toward the internal bearing surface to maintain the level of the bearing lubricant, the second lip contacting the trunnion arcuate surface and is directed away from the internal bearing surface to deny the entrance of environmental contaminants, the combination of the thin section and the two symmetrical lips allowing the interference points of the seal to float, said elastomeric body having a third annual lip having a radius greater than the radius of the second annular lip and projecting outwardly of said stiffening ring and beyond said outwardly extending annular rim thereof and beyond the open end of the bearing cup for contacting the end of the trunnion arcuate surface remote from the outer cylindrical journal surface to deny entrance of the environmental contaminants into the bearing up.

* * * * *